(No Model.) 2 Sheets—Sheet 1.
O. HANSON & A. FYRBERG.
VELOCIPEDE.
No. 406,581. Patented July 9, 1889.
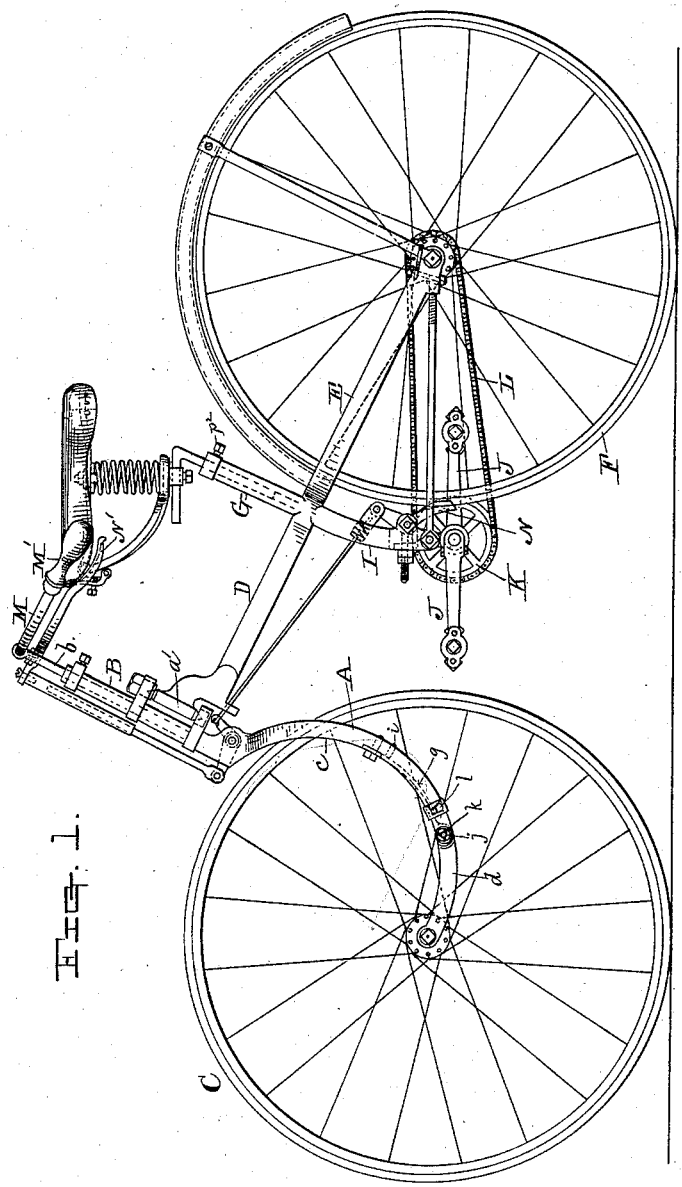

(No Model.) 2 Sheets—Sheet 2.
O. HANSON & A. FYRBERG.
VELOCIPEDE.
No. 406,581. Patented July 9, 1889.
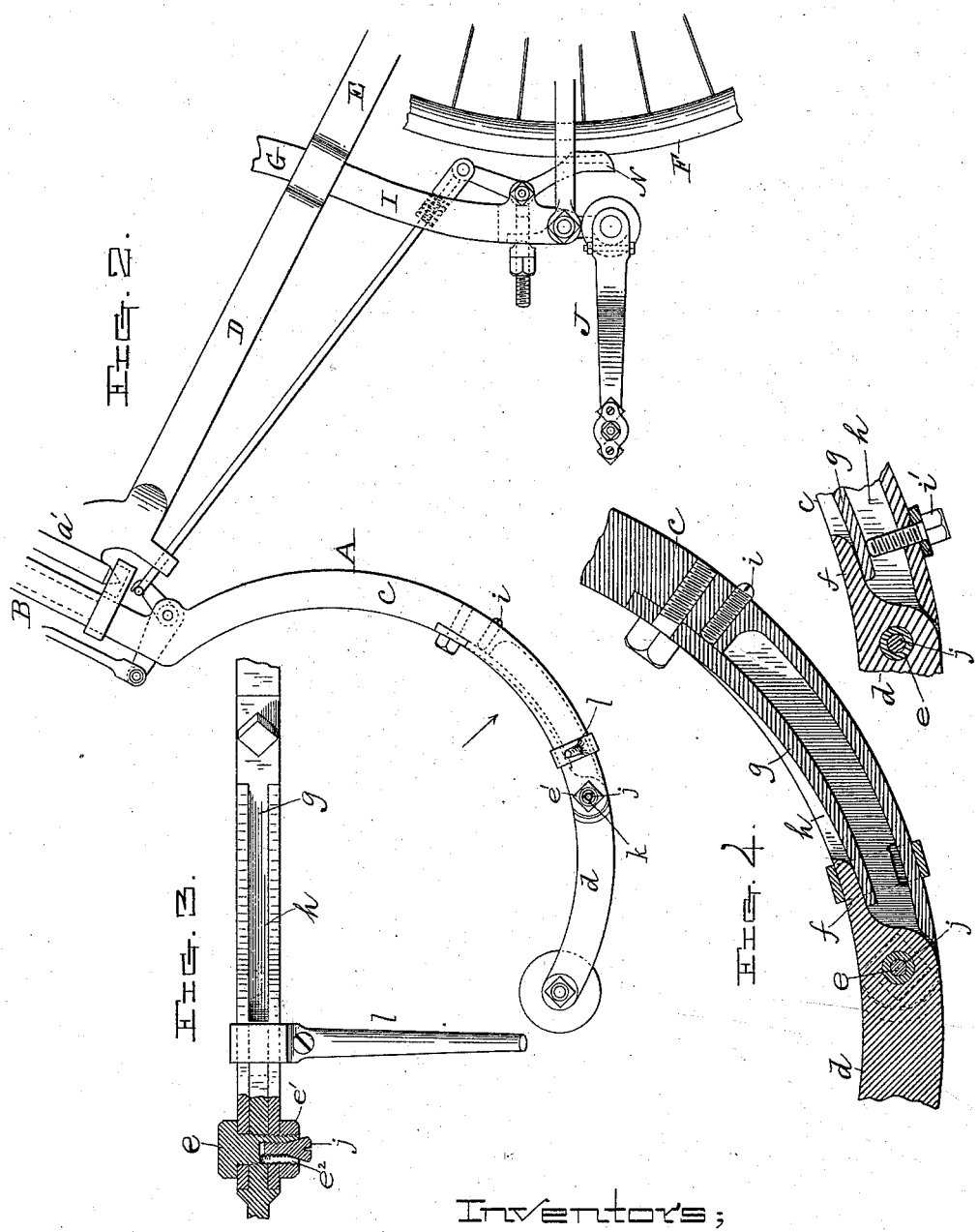
Witnesses;
Walter B. Nourse.
Forrest E. Wesson.
Inventors;
Olaus Hanson.
Andrew Fyrberg.
By A. A. Barker. Att'y.

UNITED STATES PATENT OFFICE.

OLAUS HANSON AND ANDREW FYRBERG, OF WORCESTER, MASSACHUSETTS, ASSIGNORS TO IVER JOHNSON, OF SAME PLACE.

VELOCIPEDE.

SPECIFICATION forming part of Letters Patent No. 406,581, dated July 9, 1889.

Application filed November 1, 1888. Serial No. 289,756. (No model.)

*To all whom it may concern:*

Be it known that we, OLAUS HANSON and ANDREW FYRBERG, both citizens of the United States, residing at Worcester, in the county of Worcester and State of Massachusetts, have invented certain new and useful Improvements in Velocipedes; and we do hereby declare that the following is a full, clear, and exact description thereof, reference being had to the accompanying drawings, forming a part of this specification, and in which—

Figure 1 represents a side view of a bicycle embodying our improvements. All the following figures are upon an enlarged scale. Fig. 2 is a side view of part of the bicycle shown in Fig. 1. Fig. 3 is a top view of one of the arms of the front fork, partly in section, also showing the foot-rest thereon; and Fig. 4 is a central vertical section through the parts shown in Fig. 3.

Our invention relates to what are commonly known as "safety" velocipedes, whose front and back wheels are of about equal diameter, and more especially to bicycles, but is also applicable to tricycles and similar machines.

It consists in improvements in the front fork construction, as hereinafter more fully set forth.

In order that others may better understand the nature and purpose of our invention, we will now proceed to describe it more in detail, with reference to the accompanying drawings.

The various main parts of the bicycle are in brief, as follows:

A is the front fork, which extends down from the front frame B, and to the lower end of which is pivoted the front wheel C.

D is the backbone or central frame, pivoted at its forward end at $a'$ to the front frame B, and which extends back to form the rear fork E, to which the back wheel F is pivoted. Said central frame is also provided with the arm G, extending upward to support the seat H, and with an arm I, extending downward to support the bearing for the foot-levers J J, and the front sprocket-wheel K of the driving-chain L.

M is the handle-bar, provided with handles M', and connected through the rod $b$ with the front fork, so as to operate said fork in guiding the machine, as usual; and N is the brake, connected with the handle N' under the handle-bar by means of suitable connections extending under the central frame and up in front of the front frame also, as usual.

Having described briefly and in a general way the whole machine, we will now describe our improvements thereon in detail.

Our improved front fork is constructed as follows: Each arm $c$ thereof is preferably made in curved form, curving down and back, as shown in Figs. 1, 2, and 4, and is provided with a separate section $d$ at the lower end thereof pivoted at $e$ to each arm and having a cam projection or tongue $f$ at the inner end of each, adapted to bear downward upon the lower end of a suitable spring $g$, secured in this instance at its upper end to each main part $c$ of the fork, a vertical slot $h$ being formed in said part $c$ to receive said projection or tongue and spring, as is fully shown in Figs. 3 and 4 of the drawings.

By the above construction it is obvious that the weight of the forward end of the velocipede is borne in a large measure by the spring $g$, which in practice is made of sufficient strength to serve as a safe and yielding support for the rider and to relieve said rider from the evils effects of concussions or shocks in passing over stones and similar obstructions.

The stiffness or resistance of the spring $g$ may be regulated to a certain extent by means of an adjusting-screw $i$, passed up through the fork and bearing against the under side of said spring near its upper or fastened end, as is shown in Fig. 4.

In order that the nut $e'$ on the pivot-bolt $e$ may be held in position from turning, and thus hold said bolt securely in position, the bolt is provided at its screw end $e^2$ with a central longitudinal threaded opening to receive an expanding-screw $j$, and said end is also provided with two or more transverse slots $k$ (see Fig. 2) to admit of the expansion of said screw end of the bolt. Being thus made, it is obvious that when the nut $e'$ is in position by turning the screw $j$ into the longitudinal opening in the bolt, as shown in Fig. 3, the latter is expanded and holds the nut securely from turning in either direction, thereby preventing the bolt from becoming loose and falling out of the bearing.

If desired, an adjustable holding-screw $i'$ may be passed up through each fork-arm, adapted to be turned against the under side of the lower ends of springs $g$, and thereby producing a rigid or stiff fork, instead of a spring-fork, as previously described.

It is preferable to employ a foot-rest $l$ on each of the fork-arms; but we do not limit ourselves thereto, as said foot-rests do not constitute an essential feature of our invention. They may be fastened in position in any convenient and well-known way, preferably just above the pivots $e$, as is shown in the drawings.

As the vertical slots $h$ do not extend entirely through each arm, it is obvious that should the spring $g$ break, which is not liable to occur, the machine is not crippled and the rider may continue on, as the projections $f$ simply drop down and rest in the bottoms of said slots instead of upon the springs. It is preferable to employ a cushion $g'$ under the lower end of the spring $g$ for said spring to strike against when sprung down in riding the machine. The front fork has heretofore been made in various ways to effect a yielding support to the front end of the velocipede, and we therefore do not claim this feature, broadly.

Modifications in the construction of the various parts may be made to suit different requirements without departing from the principle of our invention.

What we claim as new, and desire to secure by Letters Patent, is—

1. In a velocipede, the front fork having the arms thereof made in two parts, one pivoted to the other, with the main parts provided with a suitable spring extending under the upper end of the end section of each arm, and said end sections provided with a projection extending above its pivot, adapted to bear upon the spring aforesaid, substantially as and for the purpose set forth.

2. In a velocipede, the combination of the main parts $c$ of the front fork, having the springs $g$ secured thereto and extending under the end sections $d$ of said arms, with said end sections $d$ pivoted at their upper ends to the lower ends of the main parts $c$, and having the flanges $f$ at their upper ends extending above their pivots and adapted to bear upon the top of the aforesaid springs, and the wheel-axle, substantially as and for the purpose set forth.

3. In a velocipede, the combination of the main parts $c$ of the front fork, each having the vertical slot $h$, and the spring $g$, secured thereto in said slot, the free ends of said springs extending under the upper ends of the end sections $d$, and adjusting-screws $i$, adapted to bear upon the under sides of the springs $g$ with said end sections $d$ pivoted to the lower ends of the main parts $c$, and having a flange $f$ at the upper end of each extending above the pivots of said sections and adapted to bear upon the tops of springs $g$, and the front-wheel axle, substantially as and for the purpose set forth.

4. In a velocipede, the combination of the main parts $c$ of the front fork, having the springs $g$ secured thereto and extending under the end sections $d$ of said arms, and adjusting-screws $i$, adapted to bear upon the under side of each spring $g$, with said end sections $d$ pivoted to the lower ends of the main parts $c$, and each having a flange $f$ at its upper end extending above the pivots of said sections and adapted to bear upon the tops of springs $g$, the foot-rests, and front-wheel axle, substantially as and for the purpose set forth.

5. In a velocipede, the front-fork pivot consisting of the pivot-bolt $e$, having a threaded longitudinal opening and transverse slots at its screw end to admit of said end being expanded, the expanding-screw $j$, and holding-nut $e'$, in combination with the main part $c$ and end section $d$ of the front fork, substantially as and for the purpose set forth.

6. In a velocipede front fork, the combination of the main part $c$, having the spring $g$ secured in the vertical slot $h$, and the cushion $g'$ in said slot under the lower end of said spring, with the end section $d$ pivoted to the lower end of the main part $c$ and having a flange $f$, adapted to bear upon the lower end of spring $g$, substantially as and for the purpose set forth.

7. In a velocipede front fork, the combination of the main part $c$, having a spring $g$ secured in a vertical slot $h$, and the adjustable holding-screw $i'$, adapted to bear against the under side of the lower end of said spring $g$, with the end section $d$ pivoted to the lower end of the main part $c$ and having a flange $f$ adapted to bear upon the lower end of spring $g$, substantially as and for the purpose set forth.

OLAUS HANSON.
ANDREW FYRBERG.

Witnesses:
A. A. BARKER,
W. B. NOURSE.